Patented June 19, 1928.

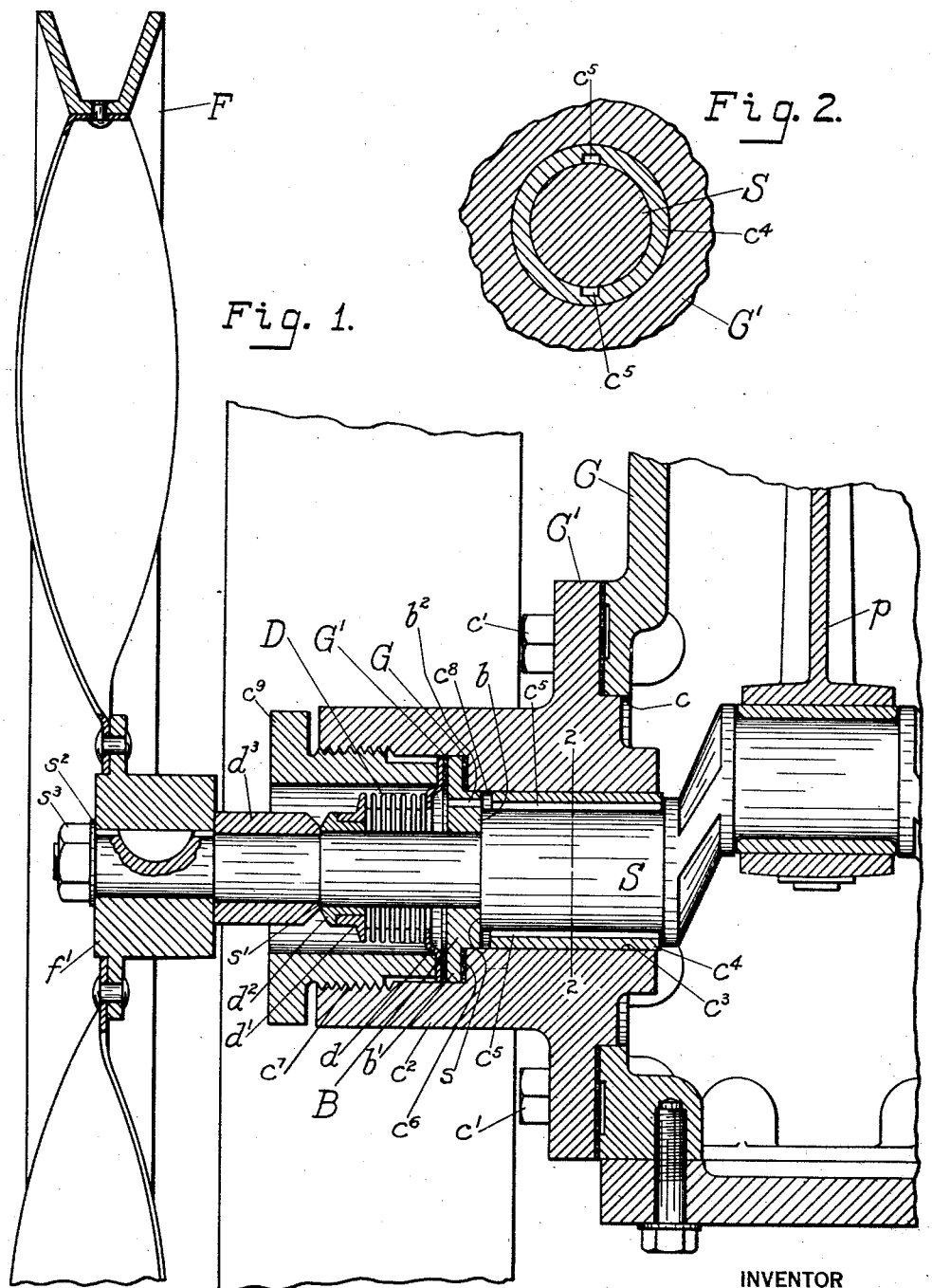

1,673,932

UNITED STATES PATENT OFFICE.

WILLIAM M. BAXTER, OF FORT WAYNE, INDIANA, ASSIGNOR TO WAYNE COMPANY, OF FORT WAYNE, INDIANA, A CORPORATION OF INDIANA.

PACKING FOR SHAFTS.

Application filed July 1, 1926. Serial No. 119,787.

My invention relates to compressors for handling gases and particularly for those used in refrigerating apparatus, especially that for domestic use.

The principal object of this invention is to provide an efficient packing for the crank shaft of a refrigerating apparatus, such a packing as will prevent leakage of either refrigerant or lubricant from the compressor casing around the crank shaft.

Another object is to provide a simple, easily assembled and sturdy form of shaft packing by the use of a resilient longitudinally compressible, circumferentially-corrugated, cylindrical packing around said shaft without any separate co-acting spring. The necessary spring pressure is supplied by the said cylindrical packing.

Another object of the invention is to use the pressure in the compressor casing to help seal the crank shaft packing.

In the particular embodiment of my invention selected for illustration,

Figure 1 shows the casing of a refrigerating apparatus for domestic use in vertical section taken axially of the crank shaft bearing, the shaft itself being shown in full and parts of the apparatus unnecessary to an understanding of this invention being broken away, and Fig. 2, a detail, is a cross section on the line 2—2 of Fig. 1.

Referring now to the drawing, C is the main portion of the compressor casing with an opening $c$, adapted to be closed by a plate $C^1$, secured in position by cap screws $c^1$. The plate $C^1$ has a boss $c^2$ bored at $c^3$ and provided with a sleeve $c^4$ to form a bearing for the crank shaft S, and has internal longitudinal grooves $c^5$. Within the casing the crank shaft S drives a compressor piston connecting rod $p$. The shaft S has a shoulder at $s$ and another at $s^1$. The sleeve $c^4$ preferably terminates just short of the shoulder $s$ leaving an annular space $c^8$. The boss $c^2$ is counterbored to form a shoulder $c^6$ and has an internal thread $c^7$ at the top to receive the resilient bearing nut $c^9$. A gasket G rests on the shoulder $c^6$ and a thrust plate B preferably of hardened steel has its central boss $b$ seated on the shoulder $s$ and its peripheral flange $b^1$ resting on the gasket G. A gasket $G^1$ rests on the outer face of the thrust plate B.

A resilient bearing assembly consists of the collar $d$ which seats on the gasket $G^1$ and to which a suitable length of resilient, longitudinally-compressible, circumferentially grooved sheet metal D is hermetically sealed at one end while at its other end it is similarly sealed to an annular cap $d^1$. The resilient bearing assembly has at its outer end a sealing ring $d^2$ which co-acts with a sealing sleeve $d^3$, which is pressed inwardly by the hub $f^1$ of the fly wheel F against the outer end of the sealing ring $d^2$ and the shoulder $s^1$ of the shaft S. The hub $f^1$ of the fly wheel F is retained in position by a lock washer $s^2$ and a nut $s^3$.

An oil passage $b^2$ is provided to permit the flow of liquid from the compressor chamber and through the grooves $c^5$ and annular chamber $c^8$ into the resilient bearing assembly consisting of $d$, D and $d^1$, affording means for utilizing the pressure in the compressor casing to help seal the crank shaft packing.

Numerous changes may be made in the design of the shaft packing here shown and described without departing from the spirit of my invention, all of which I claim.

I claim as my invention and desire to secure by Letters Patent of the United States:—

1. In combination with a compressor having a casing provided with an aperture, a crank shaft within said casing and passing through said aperture, an annular shoulder on said shaft, a closure plate for said aperture surrounding said shaft, a thrust plate bearing against said annular shoulder, a gasket seated against said thrust plate and a collar seated against said gasket, removable means for rigidly pressing said collar against said gasket, a longitudinally expansible circumferentially corrugated flexible sleeve hermetically sealed at one of its ends to said collar, an annular cap hermetically sealed to the other end of said corrugated sleeve, a sealing ring coacting with said cap, a sealing sleeve bearing against said sealing ring, removable means for pressing said sealing sleeve against said sealing ring and means for lubricating said shaft, sealing ring and sealing sleeve from within the casing.

2. In combination with a compressor having a casing provided with an aperture, a crank shaft projecting through said aperture, outwardly faced shoulders on said shaft, a closure plate for said aperture and an internally threaded boss on said plate, a sleeve within said plate terminating short of the inner shoulder on said shaft and oil grooves on the bore of said sleeve, a thrust plate seated against the inner shoulder on said shaft and having a passage therethrough continuing said oil passage, a gasket seated against said thrust plate and a collar seated against said gasket, an axially bored nut coacting with said threaded boss on said plate and securing said collar against said gasket and thrust plate, a resilient longitudinally compressible circumferentially corrugated sleeve hermetically sealed at one of its ends to said collar, an annular cap hermetically sealed to the other end of said corrugated sleeve, a sealing ring seated in the bore of said cap, a sealing sleeve bearing against said sealing ring and means for maintaining said sealing sleeve against said sealing ring.

In testimony whereof I have hereunto set my hand.

WILLIAM M. BAXTER.